(12) United States Patent
Devenyi

(10) Patent No.: US 7,352,515 B1
(45) Date of Patent: Apr. 1, 2008

(54) ROTATIONAL-TO-LINEAR COAXIAL MECHANICAL DRIVE

(75) Inventor: Gabor Devenyi, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 45 days.

(21) Appl. No.: 11/508,792

(22) Filed: Aug. 22, 2006

(51) Int. Cl.
    *G02B 15/14* (2006.01)
    *G02B 7/02* (2006.01)

(52) U.S. Cl. .................. 359/694; 359/696; 359/819; 359/822; 359/830

(58) Field of Classification Search ............... 359/642, 359/676, 694
See application file for complete search history.

(56) References Cited

U.S. PATENT DOCUMENTS 6,154,325 A * 11/2000 Kotani et al. ............... 359/699
6,288,855 B1   9/2001 Devenyi
6,819,510 B1  11/2004 Devenyi
6,931,960 B1   8/2005 Devenyi
6,967,793 B1 * 11/2005 Devenyi .................... 359/819

* cited by examiner

*Primary Examiner*—Akm Ullah
*Assistant Examiner*—Mahidere S Sahle
(74) *Attorney, Agent, or Firm*—Leonard A. Alkov; H. Saint St. Julian; John J. Horn

(57) ABSTRACT

A linear mechanical drive has an outer housing, a drive sleeve that is conformably and slidably received within the outer housing, a mount sleeve conformably and slidably received within the drive sleeve, and a guide extending between the outer housing and the mount sleeve to prevent the mount sleeve from rotating relative to the outer housing. A linearly driven structure is affixed to the mount sleeve. There is a first helical engagement between the outer housing and the drive sleeve, and a second helical engagement between the mount sleeve and the drive sleeve. A motor is positioned to actuate the drive sleeve engagement.

16 Claims, 2 Drawing Sheets

ROTATIONAL-TO-LINEAR COAXIAL MECHANICAL DRIVE

This invention relates to a mechanical drive and, more particularly, to a mechanical drive that converts rotational motion of a motor output to linear movement.

BACKGROUND OF THE INVENTION

Many types of devices require that the rotational output of a common electrical motor, such as a stepper motor, be converted to a linear movement. One conventional rotational-to-linear movement is a leadscrew assembly. In a leadscrew assembly, a motor rotationally turns a leadscrew. A leadscrew follower engages the thread of the leadscrew to slidably move linearly along the length of the leadscrew according to the rotational direction and rotational velocity of the motor rotational output. A driven structure is affixed to the leadscrew follower.

The approach of the leadscrew assembly is widely used, but in some applications it has drawbacks. The axis of the leadscrew is parallel to, but transversely displaced from, the axis of movement of the driven structure, which can significantly increases the dimensions of the leadscrew assembly and can also lead to undesirable bending forces. The leadscrew assembly necessarily includes the mass and bulk of the leadscrew and the leadscrew follower, which are often much greater than the mass and bulk of the driven structure, so that the total mass and external dimensions may be much higher than that of the driven structure. For some applications, the added mass and size are highly undesirable. For those applications where the required axial travel of the driven structure is relatively short, the leadscrew assembly is operable but heavy and oversize. The leadscrew and follower are often made of a different material than the driven structure, so that there can be differential thermal stresses when the leadscrew assembly is heated or cooled.

There is accordingly a need for a different approach to converting the rotational motion of a conventional electrical motor to the linear motion needed for driving some driven structures, particularly those whose axial travel is relatively small. The present invention fulfills this need, and further provides related advantages.

SUMMARY OF THE INVENTION

The present approach provides a linear mechanical drive that converts the rotational motion of a conventional electrical motor to a linear motion. The linear mechanical drive is compact in size and light in weight, inasmuch as no leadscrew and leadscrew follower are utilized. As a result, there is no transverse displacement between the drive axis of a leadscrew and the axis of movement of the driven structure. The mating components are preferably made of the same material, avoiding differential thermal strains and stresses. Additionally, the movement may be made with a wide range of driven linear movements relative to the rotational rate of the drive motor.

In accordance with the invention, a linear mechanical drive comprises an outer housing having a right circular cylindrical internal surface and a cylindrical axis. A drive sleeve has a right circular cylindrical external surface conformably and slidably received within the right circular cylindrical internal surface of the outer housing, a right circular cylindrical internal surface, and a drive sleeve engagement. The drive sleeve engagement is preferably a circumferential gear in an outer periphery of the drive sleeve.

A mount sleeve includes a right circular cylindrical external surface conformably and slidably received within the right circular cylindrical internal surface of the drive sleeve. Preferably but not necessarily, the outer housing, the drive sleeve, and the mount sleeve are made of the same material. A guide extends between the outer housing and the mount sleeve to prevent the mount sleeve from rotating relative to the outer housing. The guide may include a slot in the external surface of the mount sleeve and extending parallel to the cylindrical axis, and a post extending inwardly from the outer housing and engaging the slot.

There is a first helical engagement between the outer housing and the drive sleeve, and a second helical engagement between the mount sleeve and the drive sleeve. Each of the first helical engagement and the second helical engagement may include a spring ring, optionally with a preload segment thereon. Preferably, the first helical engagement comprises a helical internal housing groove in the outer housing, a helical external drive-sleeve groove in the drive sleeve, and a first spring ring extending between the helical internal housing groove and the external drive-sleeve groove. Similarly, the second helical engagement preferably comprises a helical internal drive-sleeve groove in the drive sleeve, a helical external mount-sleeve groove in the mount sleeve, and a second spring ring extending between the helical internal drive-sleeve groove and the external mount-sleeve groove.

In one embodiment, the first helical engagement and the second helical engagement have the same pitch sense. That is, either both have a right-hand pitch sense or both have a left-hand pitch sense. Alternatively, the first helical engagement and the second helical engagement have different pitch senses. In another embodiment, the first helical engagement and the second helical engagement have the same numerical pitch. Numerical pitch is typically measured in turns about the cylindrical axis per unit of length, such as turns per inch or turns per centimeter. The first helical engagement and the second helical engagement may instead have different numerical pitches.

Preferably, a rotary output of a motor having a pinion gear on the rotary output is positioned to engage and rotatably actuate the drive sleeve engagement. Typically, there is a linearly driven structure affixed to the mount sleeve. In a preferred application, the linearly driven structure is a lens received in and affixed to the mount sleeve.

In a preferred embodiment, a linear mechanical drive comprises an outer housing having a right circular cylindrical internal surface, and a lens drive sleeve. The lens drive sleeve has a right circular cylindrical external surface conformably and slidably received within the right circular cylindrical internal surface of the outer housing, a right circular cylindrical internal surface, and a rotational drive sleeve engagement. A lens mount sleeve has a right circular cylindrical external surface conformably and slidably received within the right circular cylindrical internal surface of the lens drive sleeve, and a lens mounted to the lens mount sleeve. A guide extends between the outer housing and the lens mount sleeve to prevent the lens mount sleeve from rotating relative to the outer housing. A first spring ring helical engagement extends between the outer housing and the lens drive sleeve, and a second spring ring helical engagement extends between the lens mount sleeve and the lens drive sleeve. Other compatible features discussed herein may be used with this embodiment as well.

The present approach achieves a geared mechanical conversion of the rotational output of a motor, such as an electrical motor, to a linear movement. The movement is highly precise, and preloading avoids backlash when the direction of movement changes. The mechanical drive is compact and can be readily constructed to close tolerances. Another important benefit is that the mechanical advantage of the linear movement relative to the rotational movement may be varied widely by the selection of the pitch sense and numerical pitches of the first helical engagement and the second helical engagement. For example, if a highly precise, fine-adjustment linear movement is required, the pitch senses are the same and the numerical pitches are just slightly different. This approach is useful for temperature compensation applications. On the other hand, if a relatively rapid linear movement is required, the pitch senses are different.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
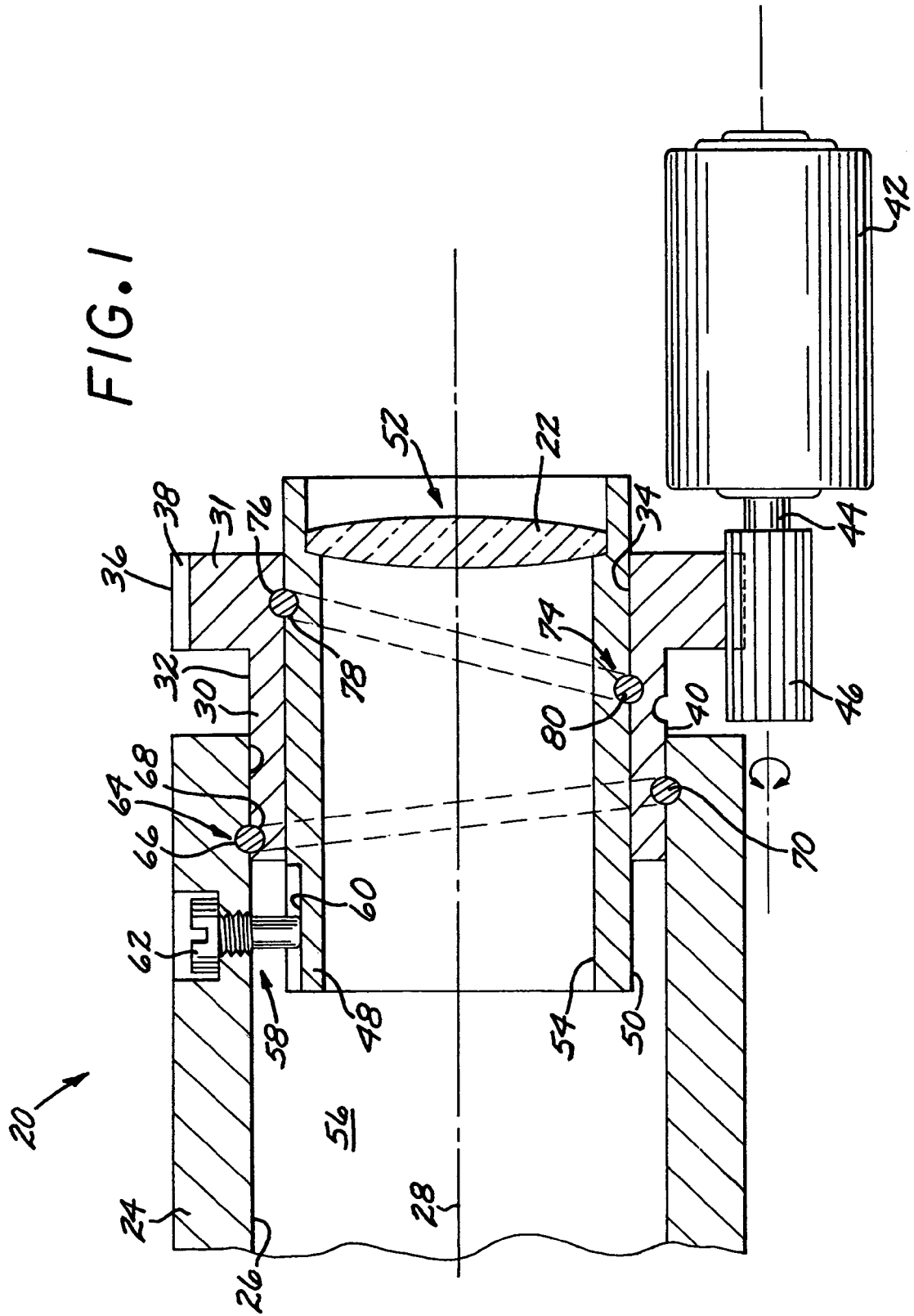
FIG. 1 is a side-sectional view of a preferred embodiment of a linear mechanical drive.
Figure 2:
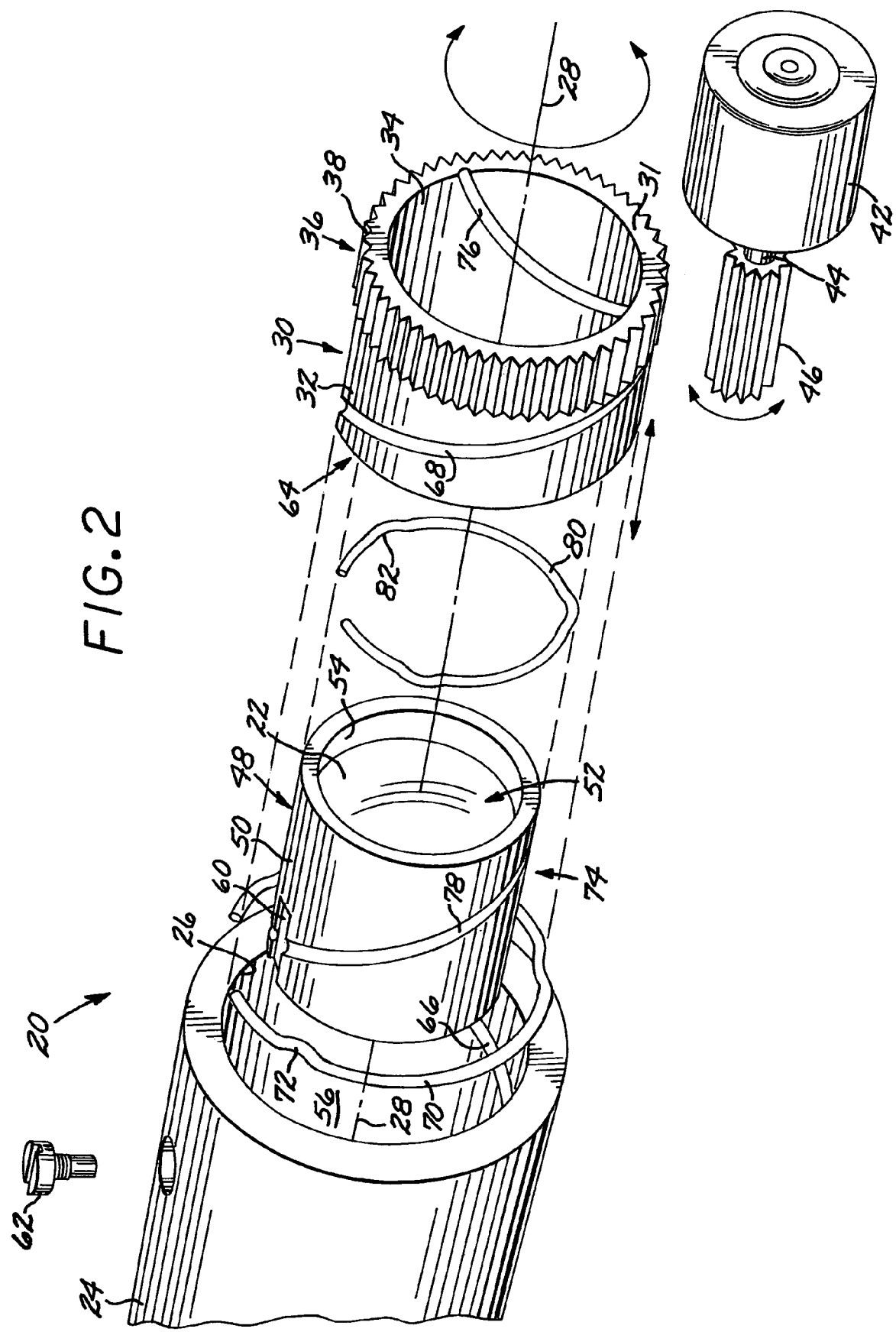
FIG. 2 is an exploded perspective view of the linear mechanical drive.

FIGS. 1-2 depict a preferred embodiment of a linear mechanical drive 20 in a preferred application, a thermal compensation drive for a lens 22. The linear mechanical drive 20 may be used in other applications as well.

The linear mechanical drive 20 includes an outer housing 24 having a right circular cylindrical internal surface 26 with a cylindrical axis 28. A drive sleeve 30 has a right circular cylindrical external surface 32 that is conformably and slidably received within the right circular cylindrical internal surface 26 of the outer housing 24. That is, the drive sleeve 30 slides smoothly both parallel to and rotatably about the cylindrical axis 28 in contact with the internal surface 26 of the outer housing 24. The contact between the drive sleeve 30 and the outer housing 24 may be lubricated if desired. The drive sleeve 30 also has a right circular cylindrical internal surface 34

The drive sleeve 30 also includes a drive sleeve engagement 36. The drive sleeve engagement 36 preferably is a circumferential gear 38 on an outer periphery 40 of the drive sleeve 30. In the illustrated embodiment, the circumferential gear 38 extends around the circumference of the outer periphery portion of a flange 31 at one end of the drive sleeve 30. The drive sleeve engagement 36 allows the drive sleeve 30 to be rotated within the outer housing 24 about the cylindrical axis 28. Preferably, a motor 42 has a rotating output shaft 44 with a pinion gear 46 positioned to engage and to rotatably actuate the drive sleeve engagement 36, in this case the circumferential gear 38.

The linear mechanical drive 20 further has a mount sleeve 48 having a right circular cylindrical external surface 50 conformably and slidably received within the right circular cylindrical internal surface 34 of the drive sleeve 30. The mount sleeve 48 slides smoothly both parallel to and rotatably about the cylindrical axis 28 in contact with the internal surface 34 of the drive sleeve 30. The contact between the mount sleeve 48 and the drive sleeve 30 may be lubricated if desired. The outer housing 24, the drive sleeve 30, and the mount sleeve 48 are preferably, but not necessarily, made of the same material such as an aluminum alloy. A linearly driven structure 52 is affixed to the mount sleeve 48. The linearly driven structure is moved parallel to the cylindrical axis 28 by the rotation of the drive sleeve engagement 36 about the cylindrical axis 28, preferably by the rotation of the output shaft 44 of the motor 42. In the illustrated embodiment, the linearly driven structure 52 is the lens 22 affixed to an internal surface 54 of the mount sleeve 48. An optical axis of the lens 22 is typically coincident with the cylindrical axis 28. The internal surface 54 of this embodiment of the mount sleeve 48 defines a cavity 56 through which an optical beam (not shown), typically coincident with the cylindrical axis 28, reaches the lens 22.

A guide 58 extends between the outer housing 24 and the mount sleeve 48. The illustrated guide 58 includes a slot 60 in the external surface 50 of the mount sleeve 48 and extending parallel to the cylindrical axis 28. The guide 58 further includes a post 62 extending inwardly from the outer housing 24 and engaging the slot 60. The illustrated post 62 is threadably engaged to the outer housing 24 so that it may be controllably inserted and removed. The engagement between the post 62 and the slot 60 prevents the mount sleeve 48 from rotating about the cylindrical axis 28 relative to the outer housing 24, while permitting the mount sleeve 48 to slide parallel to the cylindrical axis 28.

Two helical engagements are provided in the linear mechanical drive 20 to allow the rotation of the drive sleeve engagement 36 about the cylindrical axis 28 to move the linearly driven structure 52 parallel to the cylindrical axis 28.

A first helical engagement 64 extends between the outer housing 24 and the drive sleeve 30. The first helical engagement 64 preferably comprises a helical internal housing groove 66 in the internal surface 26 of the outer housing 24, and a generally facing helical external drive-sleeve groove 68 in the external surface 32 of the drive sleeve 30. A first spring ring 70 lies within and extends between the helical internal housing groove 66 and the external drive-sleeve groove 68. The first spring ring 70 effectively serves as a thread extending between the drive sleeve 30 and the outer housing 24, causing the drive sleeve 30 to move parallel to the cylindrical axis 28 when the drive sleeve 30 is rotated about the cylindrical axis 28. (The outer housing 24 may be considered to be fixed in position relative to the drive sleeve 30 and the mount sleeve 48.) The first spring ring 70 preferably has at least one, and more preferably at least three, preload segments 72 thereon. The preload segments 72 are out-of-plane bending deformities in the first spring ring 70 that are compressed against the sides of the helical internal housing groove 66 and the helical external drive-sleeve groove 68. This compression preloads the first spring ring 70 against the outer housing 24 and the drive sleeve 30, preventing backlash between the outer housing 24 and the drive sleeve 30 when the direction of movement changes. The springy preload also compensates for thermal expansion differences as the temperature changes.

Similarly, a second helical engagement 74 extends between the mount sleeve 48 and the drive sleeve 30. The second helical engagement 74 preferably comprises a helical internal drive-sleeve groove 76 in the internal surface 34 of the drive sleeve 30, and a generally facing helical external mount-sleeve groove 78 in the external surface 50 of the mount sleeve 48. A second spring ring 80 lies within and extends between the helical internal drive-sleeve groove 76 and the helical external mount-sleeve groove 78. The second spring ring 80 effectively serves as a thread extending between the drive sleeve 30 and the mount sleeve 48, causing the mount sleeve 48 to move parallel to the cylindrical axis 28 when the drive sleeve 30 is rotated about the cylindrical axis 28. The second spring ring 80 preferably has at least one, and preferably at least three, preload segments 82 thereon. The preload segments 82 are out-of-plane bending deformities in the second spring ring 80 that are compressed against the sides of the helical internal drive-sleeve groove 76 and the helical external mount-sleeve groove 78. This compression preloads the second spring ring 80 against the drive sleeve 30 and the mount sleeve 48, avoiding backlash between the drive sleeve 30 and the mount sleeve 48 when the direction of movement changes. The springy preload also compensates for thermal expansion differences as the temperature changes.

This driving approach is highly flexible in construction. The first helical engagement 64 and the second helical engagement 74 may be constructed so that they have the same pitch sense. (Pitch sense is the direction of advance parallel to the cylindrical axis 28 when a driving component is rotated about the cylindrical axis 28.) Alternatively, the first helical engagement 64 and the second helical engagement 74 may have different pitch senses. The first helical engagement 64 and the second helical engagement 74 may have the same numerical pitch, or different numerical pitches. (The numerical pitch is the amount of linear advancement along the cylindrical axis 28 resulting from a unit rotation about the cylindrical axis 28.)

If the first helical engagement 64 and the second helical engagement 74 have the same pitch sense, the advancement along the cylindrical axis 28 is the difference between their numerical pitches. For example, if the first helical engagement 64 and the second helical engagement 74 have the same pitch sense and have numerical pitches of 4 millimeters and 4.02 millimeters, the linear advance along the cylindrical axis 28 is 0.02 millimeters per turn about the cylindrical axis 28. On the other hand, if the first helical engagement 64 and the second helical engagement 74 have different pitch senses, the advancement along the cylindrical axis 28 is the sum of their numerical pitches. For example, if the first helical engagement 64 and the second helical engagement 74 have different pitch senses and have numerical pitches of 4 millimeters and 4.02 millimeters, the linear advance along the cylindrical axis 28 is 8.02 millimeters per turn about the cylindrical axis 28.

This characteristic allows the linear mechanical drive 20 be made suitable for a wide range of applications. In the illustrated case wherein the linearly driven structure 52 is the lens 22, and the linear mechanical drive 20 is to be used to achieve fine-scale thermal composition of the position of the lens 22, the pitch senses of the first helical engagement 64 and the second helical engagement 74 would normally be made the same, so that the advance of the lens 22 parallel to the cylindrical axis 28 would be small for each turn of the drive sleeve engagement 36. This design would provide a fine-scale adjustment of the position of the lens 22.

Alternatively, if the application requires that the lens 22 move a large distance with each turn of the drive sleeve engagement 36, the pitch senses of the first helical engagement 64 and the second helical engagement 74 may be made different.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A linear mechanical drive comprising:
   an outer housing having a right circular cylindrical internal surface and a cylindrical axis;
   a drive sleeve having
     a right circular cylindrical external surface conformably and slidably received within the right circular cylindrical internal surface of the outer housing,
     a right circular cylindrical internal surface, and
     a drive sleeve engagement;
   a mount sleeve having
     a right circular cylindrical external surface conformably and slidably received within the right circular cylindrical internal surface of the drive sleeve;
   a guide extending between the outer housing and the mount sleeve to prevent the mount sleeve from rotating relative to the outer housing;
   a first helical engagement between the outer housing and the drive sleeve; and
   a second helical engagement between the mount sleeve and the drive sleeve.

2. The linear mechanical drive of claim 1, further including
   a linearly driven structure affixed to the mount sleeve.

3. The linear mechanical drive of claim 1, further including
   a lens affixed to the mount sleeve.

4. The linear mechanical drive of claim 1, further including
   a motor positioned to rotatably actuate the drive sleeve engagement.

5. The linear mechanical drive of claim 1, wherein the drive sleeve engagement comprises
   a circumferential gear in an outer periphery of the drive sleeve.

6. The linear mechanical drive of claim 1, wherein the first helical engagement and the second helical engagement have the same pitch sense.

7. The linear mechanical drive of claim 1, wherein the first helical engagement and the second helical engagement have different pitch senses.

8. The linear mechanical drive of claim 1, wherein the first helical engagement and the second helical engagement have the same numerical pitch.

9. The linear mechanical drive of claim 1, wherein the first helical engagement and the second helical engagement have different numerical pitches.

10. The linear mechanical drive of claim 1, wherein the guide comprises
    a slot in the external surface of the mount sleeve and extending parallel to the cylindrical axis, and
    a post extending inwardly from the outer housing and engaging the slot.

11. The linear mechanical drive of claim 1, wherein the first helical engagement includes a spring ring.

12. The linear mechanical drive of claim 1, wherein the first helical engagement includes a spring ring having a preload segment thereon.

13. The linear mechanical drive of claim 1, wherein the first helical engagement comprises
    a helical internal housing groove in the outer housing,
    a helical external drive-sleeve groove in the drive sleeve, and a first spring ring extending between the helical internal housing groove and the external drive-sleeve groove.

14. The linear mechanical drive of claim 1, wherein the second helical engagement comprises
a helical internal drive-sleeve groove in the drive sleeve,
a helical external mount-sleeve groove in the mount sleeve, and
a second spring ring extending between the helical internal drive-sleeve groove and the external mount-sleeve groove.

15. The linear mechanical drive of claim 1, wherein the outer housing, the drive sleeve, and the mount sleeve are made of the same material.

16. A linear mechanical drive comprising:
an outer housing having a right circular cylindrical internal surface;
a lens drive sleeve having
 a right circular cylindrical external surface conformably and slidably received within the right circular cylindrical internal surface of the outer housing,
 a right circular cylindrical internal surface, and
 a rotational drive sleeve engagement;
a lens mount sleeve having
 a right circular cylindrical external surface conformably and slidably received within the right circular cylindrical internal surface of the lens drive sleeve, and
 a lens mounted to the lens mount sleeve;
a guide extending between the outer housing and the lens mount sleeve to prevent the lens mount sleeve from rotating relative to the outer housing;
a first spring ring helical engagement between the outer housing and the lens drive sleeve; and
a second spring ring helical engagement between the lens mount sleeve and the lens drive sleeve.

* * * * *